United States Patent [19]

Hogan

[11] 3,968,992

[45] July 13, 1976

[54] FOLD DOWN TABLE FOR AIRCRAFT SEAT

[75] Inventor: Gerard T. Hogan, Southington, Conn.

[73] Assignee: Universal Oil Products Company, Des Plaines, Ill.

[22] Filed: Dec. 20, 1974

[21] Appl. No.: 534,992

[52] U.S. Cl. ............................. 297/162; 312/231; 312/244
[51] Int. Cl.² ...................................... A47B 39/00
[58] Field of Search ........... 297/161, 135, 162, 160, 297/153; 312/231, 244, 233, 232; 220/18; 244/122 R; 190/29, 31, 34, 61, 16, 17; 224/42.46 B, 42.45 B, 42.42 A; 108/33, 38, 39, 50, 152

[56] References Cited
UNITED STATES PATENTS

| | | | |
|---|---|---|---|
| 310,626 | 1/1885 | Vogel | 312/232 |
| 2,067,309 | 1/1937 | Wogman | 312/231 |
| 2,617,473 | 11/1952 | Krimstock | 297/161 |
| 2,650,651 | 9/1953 | Choate | 297/153 X |
| 3,215,452 | 11/1965 | Goodwin | 312/231 X |
| 3,232,685 | 2/1966 | Wilstein et al. | 312/231 X |
| 3,297,118 | 1/1967 | Van Skyhawk | 190/16 X |
| 3,861,556 | 1/1975 | Barecki et al. | 206/371 X |

Primary Examiner—James T. McCall
Attorney, Agent, or Firm—James R. Hoatson, Jr.; Barry L. Clark; William H. Page, II

[57] ABSTRACT

Navigation table attachable by an arm to the base of an aircraft seat can be folded to a storage position beside the seat when not in use. The table surface comprises the top of a box which can be used for the storage of maps or papers. The box is mounted so that it can be easily removed from the seat and used by the pilot like a small attache case to transport maps and other materials to and from the aircraft. A plurality of adjustments on the table mounting arm permit the table surface to have its surface angle varied in addition to being movable, sideways, up and down and fore and aft.

16 Claims, 6 Drawing Figures

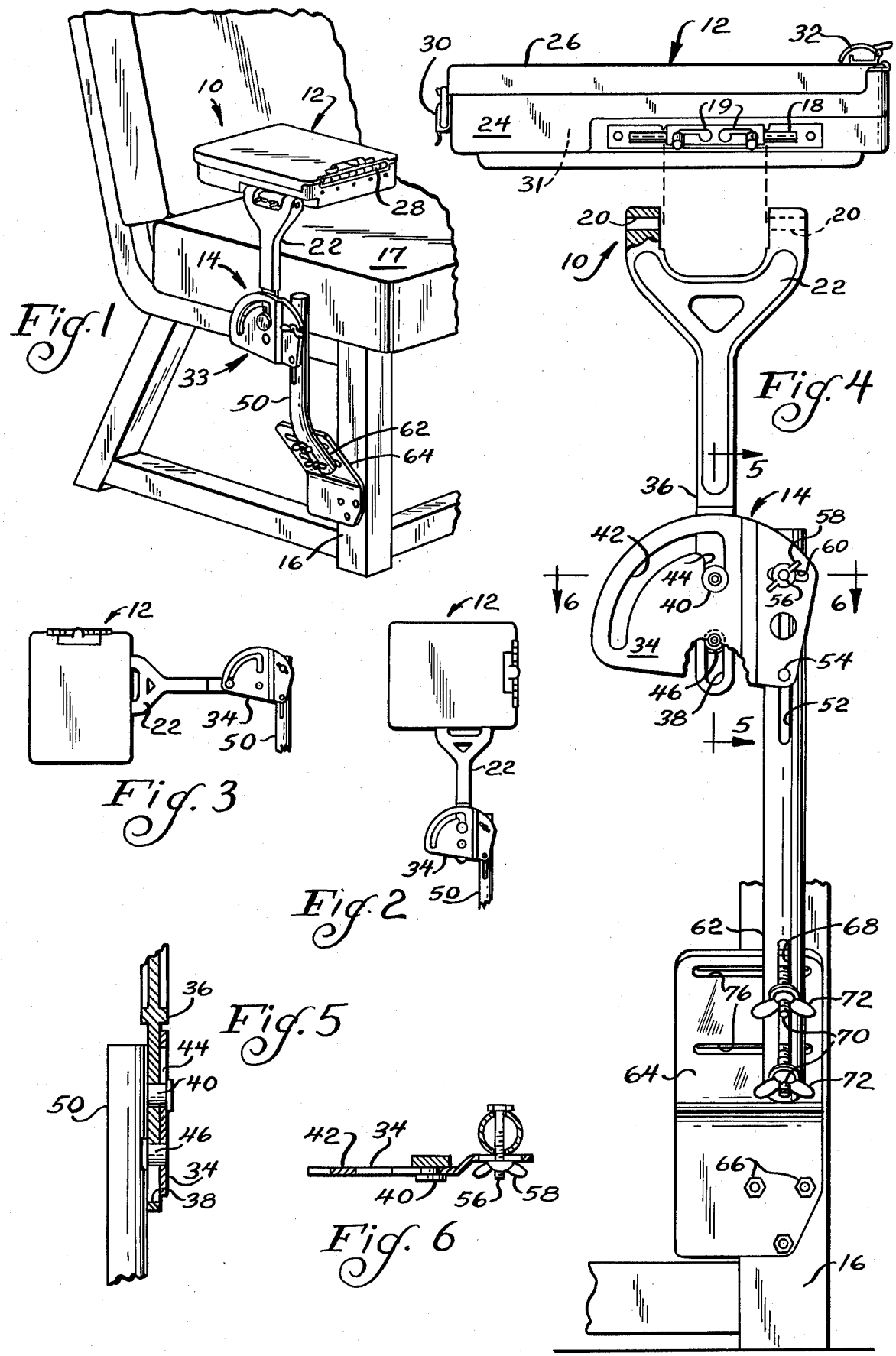

FOLD DOWN TABLE FOR AIRCRAFT SEAT

BACKGROUND OF THE INVENTION

The invention relates to seats and chairs and particularly to seats having attached writing tables. Examples of prior art chairs which include folding tablet arm structures are disclosed in U.S. Pat. Nos. 3,197,254; 3,292,972; 3,368,842; 3,479,084; 3,556,558 and 3,567,276. Such chairs are generally used in auditoriums and meeting rooms where, on certain occasions, the seat occupants have need for a writing surface. For example, school auditoriums are often used for examinations or as lecture halls.

In the field of aviation, and particularly in the general aviation field where the same person does both the flying and the navigating, it is usually necessary for the pilot to refer to maps and to write in a log book from time to time. For this purpose, small boards have been developed which include a spring clip for retaining the papers being used. The boards are referred to as kneeboards since they are adapted to be strapped to the pilot's knee. They are somewhat uncomfortable to wear, are quite small, and do not provide much protection for any papers clipped to them when exposed to winds and weather when walking to and from the aircraft. In addition, they cause the material being read or being written to be located further from the pilot's eyes than a conventional writing surface.

In view of the disadvantages of the kneeboards it would appear to be very desirable to provide a writing surface which does not attach to the user but still provides a means to carry papers to and from an aircraft. Although U.S. Pat. No. 310,626 discloses a box-like desk which forms the arm of a chair and which provides a lockable compartment for storage of writing materials, the disclosed desk does not overlie the seat and would thus be quite uncomfortable to use. Furthermore, the disclosed desk is not adapted to be removed from the chair.

SUMMARY

It is among the objects of the present invention to provide a fold down table which can be readily attached to and removed from a seat and which can be easily and quickly moved from a storage position beside the seat to a use position overlying at least a portion of the seat.

It is a further object of the invention to provide a seat attached fold down table having a writing surface which comprises the lid of a lockable storage container for papers, said container being easily separated from the seat for transporting papers.

Yet another object of the invention is to provide a seat mounted fold down table which can be adjusted in surface angle, height, fore and aft position, and side position.

The foregoing and other objects are obtained by the present invention which includes a box-like desk or table having an enclosed storage compartment and a hinged and latchable top with a spring biased paper retaining clip on its top surface. The desk is pivoted about a fore and aft axis to an arm supported by an intermediate mounting assembly to the base of a seat for movement between a generally horizontal use position overlying the seat and a temporary vertical position ninety degrees upwardly therefrom. The arm is mounted for about ninety degrees of pivotal movement about an axis parallel to the front edge of the seat so that the desk can be moved in a vertical plane at the side of the seat between the aforementioned temporary upward vertical position and a storage position which is beside the rearward portion of the seat and below the level of the seat cushion. Manually engageable fastening pins on the side of the desk define the aforementioned fore and aft axis and cooperate with spaced complementary openings in the arm to retain the desk in its operative relation with the seat. When desired, the pins can be withdrawn from the openings to permit the desk to be separated from the arm and used for a transportable storage container. The arm that supports the desk is of a "Y"-shaped configuration with the desk being carried by the arms of the "Y". The vertical base of the "Y" has a vertically elongated slot near its bottom and a pin spaced upwardly therefrom. The slot and pin cooperate with a curved slot and a pivot pin on a flat mounting plate to permit the "Y" arm to pivot 90° counterclockwise in a vertical plane to a storage position. A downward extending recess at the upper end of the slot serves as a lock which holds the arm in its upper use position since the pin on the arm will fall into the recess. The mounting plate is supported for limited rotational and vertical movement at the upper end of a generally vertical mounting member. The vertical mounting member has a vertical slot which is engaged by a pivot pin on the mounting plate and a wing type fastener which passes through a curved slot on the mounting plate. The generally vertical mounting member is angled in toward the seat at its lower end where it is adjustably held by a pair of wing type fasteners to an angled bracket. The angled bracket is bolted to the seat base and includes a pair of horizontal slots which permit fore and aft adjustment of the vertical mounting member. A slot in the angled portion of the generally vertical mounting member permits the member to be adjusted sideways and up and down relative to the seat.

BRIEF DESCRIPTION OF THE DRAWINGS

FIG. 1 is a perspective view showing the fold down table or desk and its mounting structure in operative relation with a seat;

FIG. 2 is a fragmentary side view of the desk mounting structure of FIG. 1 with the desk in the vertical position it temporarily assumes prior to storage;

FIG. 3 is a fragmentary side view similar to FIG. 2 but showing the desk mounting structure and its relation to the desk surface in a storage position;

FIG. 4 is an enlarged side view of the desk mounting structure of FIG. 1 with the desk shown in exploded relationship;

FIG. 5 is a sectional view taken on line 5—5 of FIG. 4; and

FIG. 6 is a sectional view taken on line 6—6 of FIG. 4.

DESCRIPTION OF THE PREFERRED EMBODIMENT

Referring to the drawings, the improved desk or table assembly is indicated generally at 10 and includes a removable desk member indicated generally at 12 and an adjustable mounting structure indicated generally at 14. The mounting structure 14 is attached to the base 16 of a seat such as a pilot's seat on a small aircraft so the desk 12 will overlie the seat cushion 17 thereof. The desk 12 can be removed from the mounting structure 14 by sliding movable locking pins 18 (FIG. 4)

towards each other in slots 19 so as to release them from their operative use position within the openings 20 in the Y-shaped arm member 22. The pins 18 are mounted in a recess in the side of the desk 12 and can be spring biased towards their use position if desired. The desk assembly 12 includes a hollow base portion 24 which is preferably made of a thermoformed plastic such as acrylic polyvinyl chloride. The top 26 of the desk is preferably formed of aluminum with an overlying top writing surface formed of a bonded sheet of plastic such as acrylic polyvinyl chloride. The top 26 is hinged to the base portion 24 by an elongated hinge member 28. The top is maintained closed relative to the base by a latch means 30 so as to form a box-like structure which provides a covered and sealed storage compartment 31 for maps, papers or other materials required during a flight. A spring clip 32 of the type used on clipboards is mounted on the top 26 of the desk for retaining items such as maps or a log book from moving about the cabin.

The Y-shaped arm 22, which may be formed of any suitable material such as molded aluminum, is supported by the base 16 through an intermediate mounting assembly 33 which includes a mounting plate 34. The elongated lower portion 36 of the arm member 22 includes a vertical elongated slot 38. A stop pin 40 on the arm 22 cooperates with a curved slot 42 formed in the plate 34. The curved slot 42 and the adjoining downwardly extending recess slot 44 at its upper end cooperate with pin 40 to permit the arm 22 to pivot between its locked use position shown in FIG. 2 and its storage position shown in FIG. 3. A pin 46, which is attached to the plate 34 and restrained by slot 38, provides a pivot axis for the arm 22 and permits the stop pin 40 to traverse curved slot 42 and then drop by gravity into recess 44 to lock the arm 22 in its vertical use position.

The mounting plate 34 is adjustably mounted to a mounting post 50 which is formed of metal tubing or other suitable material and includes a vertical slot 52 near its top. A pin 54 mounted on the mounting plate 34 is adapted to be moved up and down in slot 52 to provide a vertical height adjustment for the desk 12. The vertical adjusted position is maintained by a fastener means such as bolt 56 and wing nut 58 which pass through the slot 52 in the post 50 as well as through a curved slot 60 formed in the mounting plate 34. The curved slot 60 permits a small degree of angular tilting of the mounting plate 34 about pivot pin 54. The desk 12 mounted on the arm 22 will of course be tilted by the same amount. The mounting post 50 terminates in its lower end in an angled end portion 62 which overlies an angled bracket member 64 which is attached to seat base 16 by means of a plurality of bolts 66. A vertical slot 68 in the angled end portion 62 receives bolts 70 retained by wing nuts 72. The bolts 70 also pass through horizontal slots 76 formed in the bracket member 64 so as to anchor the post 50 to the bracket 64. The horizontal slots 76 permit the desk 12 to be moved fore and aft relative to the seat cushion 17 while the vertical slot 68 provides a simultaneous side-to-side and up-and-down movement of the table 12.

Although the desk 12 has been shown as including a paper retaining closed storage compartment 31 with a hinged and latched top for permitting a seat occupant to protect papers being carried to and from the seat, the invention also contemplates the use of other types of desks or table surfaces, such as, for example, one having a hollow body for retaining papers with a slot in one end open for receiving the papers, or a solid body having only a retaining means such as the clip 32 attached to it. The invention has been described in connection with a particular use in aircraft but it is obvious that it would have utility in other fields as well.

I claim as my invention:

1. In a seat of the type having a seat base and a desk mounted for movement relative to the seat base between a use position overlying the seat and a storage position beside the seat, the improvement comprising a pivot arm mounted for pivotal movement relative to the seat base in a generally vertical plane which is parallel to one side of the seat, said desk being pivotally mounted to said pivot arm for movement between an upper generally horizontal use position wherein said desk overlies said seat and a vertical position wherein said desk is movable with said pivot arm in said generally vertical plane to a storage position beside said seat, and complementary fastening means on said desk and on said pivoted arm for permitting quick removal of said desk from said arm, said desk including means for retaining papers.

2. The seat of claim 1 wherein said desk comprises a hollow box having a flat writing surface on its top.

3. The seat of claim 1 wherein said desk comprises a flat writing surface having a paper retaining spring biased clip at one end.

4. The seat of claim 2 wherein said hollow box includes means for permitting one side to be opened to provide access to the interior, said box further including latching means for latching said one side in a closed position.

5. The seat of claim 4 wherein said one side is the top side comprising said flat writing surface, said flat writing surface being hinged to said hollow box on one of its edges and latched by said latching means at its opposing edge.

6. The seat of claim 4 wherein said flat writing surface includes a paper retaining clip mounted adjacent one of its edges.

7. The seat of claim 1 wherein said pivoted arm is mounted to said base by an intermediate mounting assembly.

8. The seat of claim 7 wherein said intermediate mounting assembly includes adjustment means for selectively adjusting the use position of said desk relative to said seat.

9. The seat of claim 8 wherein said intermediate mounting assembly includes a mounting plate having a first curved slot which cooperates with a stop pin on said pivoted arm for determining the angle of pivotal movement of said pivoted arm between its use and storage position.

10. The seat of claim 9 wherein said first curved slot has a downwardly extending recess at one end for receiving and locking said stop pin when said pivoted arm is in its use position.

11. The seat of claim 10 wherein said mounting plate carries a pivot pin which cooperates with a slot in said pivoted arm to permit said stop pin on said pivoted arm to pivotally move in said curved slot and drop into said recess.

12. The seat of claim 9 wherein said mounting plate includes a second slot which cooperates with a fastener means in a generally vertical mounting member attached to the seat base for providing said mounting plate with a limited degree of angular adjustment whereby the desk carried by the pivoted arm can have its top surface either horizontal or at selected angles when in its use position.

13. The seat of claim 12 wherein said last named fastener means is mounted in an upper vertical slot in said generally vertical mounting member to permit said desk to be adjusted up or down relative to said seat.

14. The seat of claim 12 wherein said generally vertical mounting member is mounted to said seat base by a bracket member, said bracket member having at least two generally horizontal slots which cooperate with a pair of fastener members carried by said generally vertical mounting member to permit said desk to be adjusted fore and aft relative to said seat.

15. The seat of claim 14 wherein said bracket member extends upwardly and outwardly from said seat base at an angle, said generally vertical mounting member having a correspondingly angled portion at its lower end which overlies the portion of said bracket member containing said slots and includes a lower vertical slot, and a pair of fastener members mounted in said horizontal slots and said lower vertical slot for permitting said desk to be simultaneously moved sideways and up and down relative to said seat.

16. In a seat of the type having a seat base and a table mounted on a pivoted arm for movement relative to the seat base between a use position overlying the seat and a storage position beside the seat, the improvement comprising an adjustable mounting assembly for mounting said pivoted arm to said seat base, said mounting assembly comprising a plurality of fasteners, a mounting plate member for pivotally mounting said pivoted arm, a mounting post member for mounting said mounting plate and an angled mounting bracket member for mounting said mounting post to said seat base, said mounting plate member, said mounting post member and said mounting bracket member each including at least one slot for adjustably positioning said member relative to an adjacent member whereby said table can be adjusted up and down, fore and aft, sideways and in a tilting direction.

* * * * *